United States Patent
Lee et al.

(10) Patent No.: US 9,263,187 B2
(45) Date of Patent: Feb. 16, 2016

(54) MULTILAYER CERAMIC ELECTRONIC COMPONENT AND METHOD OF MANUFACTURING THE SAME

(75) Inventors: Kwang Jik Lee, Gyunggi-do (KR); Suk Jin Ham, Gyunggi-do (KR); Ji Hyuk Lim, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 46 days.

(21) Appl. No.: 13/570,987

(22) Filed: Aug. 9, 2012

(65) Prior Publication Data

US 2013/0050901 A1 Feb. 28, 2013

(30) Foreign Application Priority Data

Aug. 23, 2011 (KR) .................. 10-2011-0084112

(51) Int. Cl.
*H01G 4/12* (2006.01)
*B32B 38/04* (2006.01)
*H01G 4/005* (2006.01)
*H01G 4/008* (2006.01)
*B82Y 30/00* (2011.01)

(52) U.S. Cl.
CPC .............. *H01G 4/005* (2013.01); *H01G 4/008* (2013.01); *H01G 4/12* (2013.01); *B82Y 30/00* (2013.01)

(58) Field of Classification Search
CPC .................................. H01G 4/12; B32B 38/04
USPC ........................................................ 361/305
See application file for complete search history.

(56) References Cited

U.S. PATENT DOCUMENTS

| 2010/0273060 | A1* | 10/2010 | Yang et al. ................. 429/231.8 |
| 2011/0033746 | A1* | 2/2011 | Liu et al. ....................... 429/209 |
| 2011/0101365 | A1 | 5/2011 | Kim et al. |
| 2011/0121240 | A1* | 5/2011 | Amine et al. ................. 252/502 |
| 2011/0177398 | A1* | 7/2011 | Affinito et al. ................ 429/325 |
| 2011/0247186 | A1* | 10/2011 | Yu .......................... H01G 4/012 29/25.42 |
| 2012/0328960 | A1* | 12/2012 | Ito .......................... H01G 11/60 429/336 |

FOREIGN PATENT DOCUMENTS

| KR | 2011/0047454 A | 5/2011 |
| KR | 2011-0058223 A | 6/2011 |

* cited by examiner

*Primary Examiner* — Jenny L Wagner
*Assistant Examiner* — Michael P McFadden
(74) *Attorney, Agent, or Firm* — NSIP Law

(57) ABSTRACT

There is provided a multilayer ceramic electronic component, including: a ceramic main body including a dielectric layer; and first and second internal electrodes provided on upper and lower surfaces of the dielectric layer and formed of a thin film including graphene. The multilayer ceramic electronic component includes internal electrodes formed of a thin film including graphene, thereby having increased capacitance and improved thermal stability and withstand voltage characteristics.

11 Claims, 4 Drawing Sheets

MULTILAYER CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2011-0084112 filed on Aug. 23, 2011, in the Korean Intellectual Property Office, the disclosure of which is incorporated herein by reference.

BACKGROUND OF THE INVENTION

1. Field of the Invention

The present invention relates to a multilayer ceramic electronic component and a method of manufacturing the same, and more particularly, to a multilayer ceramic electronic component having increased capacitance and improved thermal stability and withstand voltage characteristics, and a method of manufacturing the same.

2. Description of the Related Art

In accordance with the recent trend for the miniaturization of electronic products, demand for a small sized, high capacitance multilayer ceramic electronic component has increased.

Therefore, dielectric layers and internal electrodes have been thinned and laminated through various methods. Recently, as the thickness of individual dielectric layers has been thinned, multilayer ceramic electronic components having an increased number of layers have been manufactured.

However, there is a need to efficiently design a structure between ceramic layers and internal electrode layers through new technology in order to manufacture a multilayer ceramic electronic component having high capacitance.

In accordance with this need, efforts for laminating the ceramic layers and the internal electrode layers have been continuously conducted to date.

Particularly, research into a technology for decreasing the thicknesses of the ceramic layers and the internal electrode layers and increasing the number of layers in order to miniaturize the multilayer ceramic electronic component and increase capacitance thereof has been conducted. However, there are still limitations to this technology.

SUMMARY OF THE INVENTION

An aspect of the present invention provides a multilayer ceramic electronic component having increased capacitance and improved thermal stability and withstand voltage characteristics, and a method of manufacturing the same.

According to an aspect of the present invention, there is provided a multilayer ceramic electronic component including: a ceramic main body including a dielectric layer; and first and second internal electrodes provided on upper and lower surfaces of the dielectric layer and formed of a thin film including graphene.

The thin film including graphene may have a structure in which ten or less graphene thin films are laminated.

The first or second internal electrodes may have a thickness of 5 nm or less.

The first and second internal electrodes may be formed by a chemical vapor deposition (CVD) method.

The dielectric layer may include at least one selected from the group consisting of magnesium (Mg), calcium (Ca), strontium (Sr), barium (Ba), lanthanum (La), titanium (Ti), and zirconium (Zr).

According to another aspect of the present invention, there is provided a multilayer ceramic electronic component including: a ceramic main body including a plurality of dielectric layers; and a plurality of internal electrodes alternately laminated with the plurality of dielectric layers within the ceramic main body and formed of a thin film including graphene.

The thin film including graphene may have a structure in which ten or less graphene thin films are laminated.

Each of the plurality of internal electrodes may have a thickness of 5 nm or less.

The plurality of internal electrodes may be formed by a chemical vapor deposition (CVD) method.

The dielectric layers may include at least one selected from the group consisting of magnesium (Mg), calcium (Ca), strontium (Sr), barium (Ba), lanthanum (La), titanium (Ti) and zirconium (Zr).

According to another aspect of the present invention, there is provided a method of manufacturing a multilayer ceramic electronic component, the method including: preparing a plurality of ceramic green sheets; forming first and second internal electrode patterns on the ceramic green sheets, the first and second internal electrode patterns being formed of a thin film including graphene; forming a ceramic laminate by laminating the ceramic green sheets having the first and second internal electrode patterns formed thereon; forming a ceramic main body including first and second internal electrodes by cutting the ceramic laminate so as to allow one ends of the first and second internal electrode patterns to be alternately exposed through ends of the ceramic main body and then firing the cut ceramic laminate; and forming first and second external electrodes on the ends of the ceramic main body so as to be electrically connected to one ends of the first and second internal electrodes.

The thin film including graphene may have a structure in which ten or less graphene thin films are laminated.

The first or second internal electrodes may have a thickness of 5 nm or less.

The forming of the first and second internal electrode patterns may be performed by a chemical vapor deposition (CVD) method.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
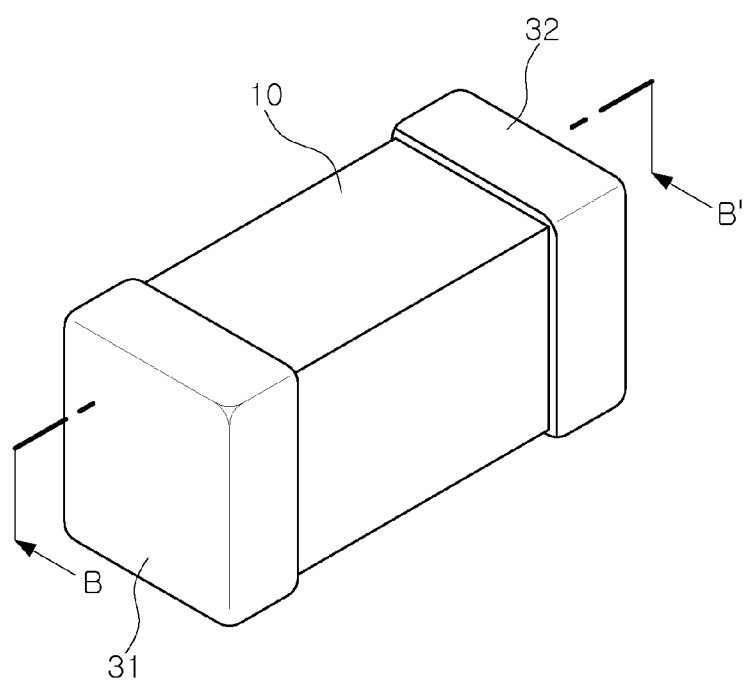
FIG. 1 is a perspective view of a multilayer ceramic capacitor according to an embodiment of the present invention.

Embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions of elements may be exaggerated for clarity, and the same reference numerals will be used throughout to designate the same or like elements.

Embodiments of the present invention will now be described in detail with reference to the accompanying drawings.

FIG. 1 is a perspective view of a multilayer ceramic capacitor according to an embodiment of the present invention.

Figure 2:
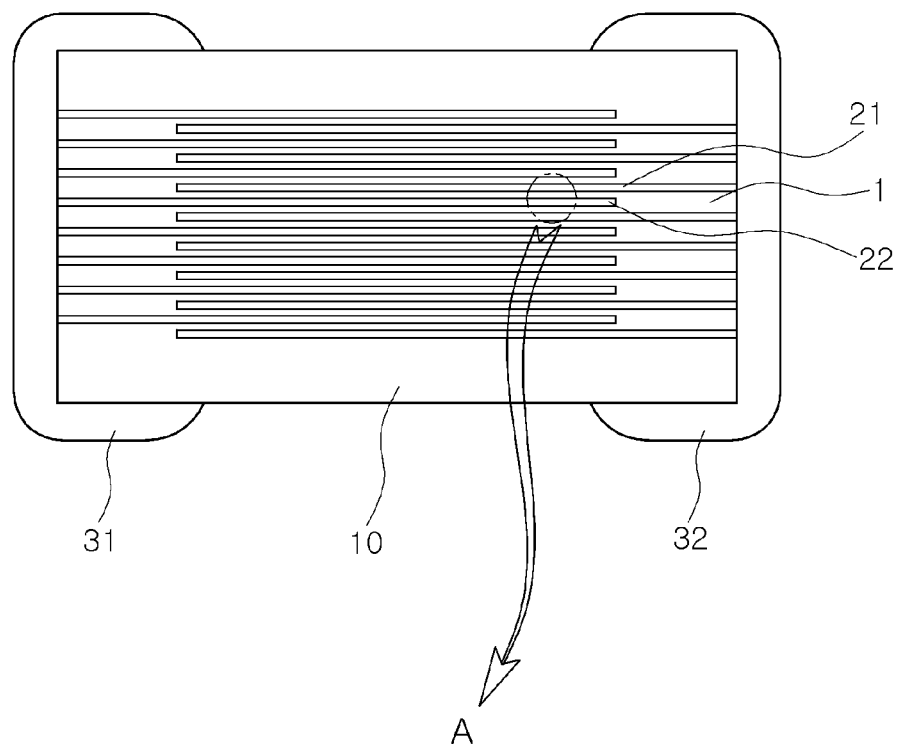
FIG. 2 is a cross-sectional view taken along line B-B' of FIG. 1.

FIG. 2 is a cross-sectional view taken along line B-B' of FIG. 1.

Figure 3:
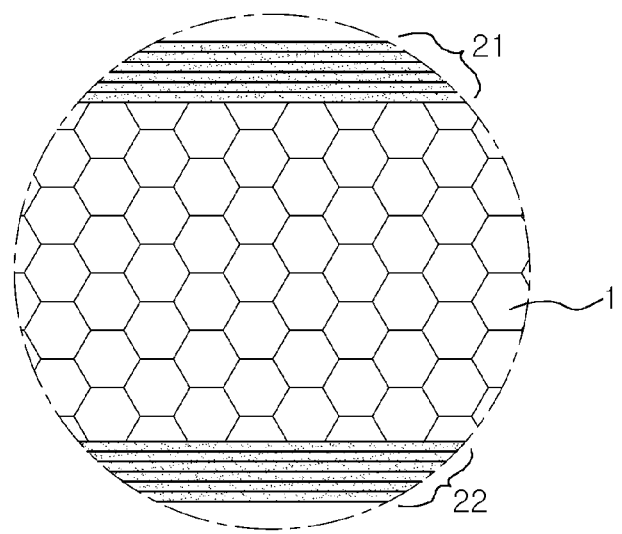
FIG. 3 is an enlarged view of part A of FIG. 2.

FIG. 3 is an enlarged view of part A of FIG. 2.

Referring to FIGS. 1 through 3, a multilayer ceramic electronic component according to an embodiment of the present invention may include a ceramic main body 10 including a dielectric layer 1; and first and second internal electrodes 21 and 22 respectively formed on upper and lower surfaces of the dielectric layer 1 and formed of a thin film including graphene.

Hereinafter, the multilayer ceramic electronic component according to the embodiment of the present invention will be described. In particular, a multilayer ceramic capacitor will be described by way of example. However, the present invention is not limited thereto.

According to the embodiment of the present invention, a material for the dielectric layer 1 is not specifically limited but may include at least one selected from the group consisting of, for example, magnesium (Mg), calcium (Ca), strontium (Sr), barium (Ba), lanthanum (La), titanium (Ti), and zirconium (Zr).

In addition, the dielectric layer 1 may have an additive added thereto, in addition to the above-mentioned material.

The additive is not particularly limited, but may be, for example, zirconium acetate ($ZrAc_4$), zirconium chloride ($ZrCl_4$), calcium acetate ($Ca(C_2H_3O_2)_4$), or the like.

The multilayer ceramic electronic component according to the embodiment of the present invention may include the first and second internal electrodes 21 and 22 respectively formed on the upper and lower surfaces of the dielectric layer 1 and formed of a thin film including graphene.

Graphene is a conductive material that is mostly used for an electrode of a flexible substrate in substitution for indium tin oxide (ITO) used as a transparent electrode material.

Graphene is a material in which a thickness of a single layer thereof may be as thin as about 0.3 nm; while the electrical conductivity and thermal conductivity thereof remain excellent.

According to the embodiment of the present invention, the first and second internal electrodes 21 and 22 are formed of a thin film including graphene, whereby the thickness of individual internal electrodes may be decreased and capacitance may be increased.

In particular, the thickness of the first internal electrode 21 or the second internal electrode 22 is not specifically limited, but it may be for example, 5 nm or less.

Since the first and second internal electrodes 21 and 22 are formed of an ultra thin film as described above, the number of laminated layers in a multilayer ceramic electronic component having the same size as the related art component may be increased to thereby increase capacitance.

In addition, since graphene has excellent electrical conductivity and thermal conductivity, in the case in which the first and second internal electrodes 21 and 22 are formed of a thin film including graphene, thermal stability may be excellent.

In addition, since graphene allows the first and second internal electrodes 21 and 22 to be formed as a thin film, short-circuits between the thin internal electrodes may not occur, whereby withstand voltage characteristics may be improved.

The thin film including graphene is not particularly limited. For example, the first and second internal electrodes 21 and 22 may be formed by laminating ten or less graphene thin films.

A single thin film including graphene may have a thickness of about 0.3 nm, and the ten or less graphene thin films may be laminated to thereby form the first and second internal electrodes 21 and 22. In this case, the effect of the present invention may be maximized.

That is, in the case in which the internal electrodes are formed by laminating more than ten thin films including graphene, an increase in capacitance and improvement in thermal stability and withstand voltage characteristics may not be sufficient, while the thickness of the internal electrode may only be increased.

In addition, according to the embodiment of the present invention, a method of forming the first and second internal electrodes 21 and 22 is not particularly limited, but may be for example, chemical vapor deposition (CVD).

Since the first and second internal electrodes 21 and 22 are formed by CVD, they may be formed of thin films.

The first and second internal electrodes 21 and 22 may be formed on an upper portion of the dielectric layer 1 by a transfer method.

Meanwhile, in order to form capacitance, first and second external electrodes 31 and 32 may be formed on ends of the ceramic main body 10 and may be electrically connected to the first and second internal electrodes 21 and 22.

The first and second external electrodes 31 and 32 may be formed of the same conductive material as that of the internal electrodes, without being limited thereto. For example, the first and second external electrodes 31 and 32 may be formed of copper (Cu), silver (Ag), nickel (Ni), or the like.

The first and second external electrodes 31 and 32 may be formed by applying a conductive paste prepared by adding glass frit to a metal powder to the ends of the ceramic main body and firing the same.

A multilayer ceramic electronic component according to another embodiment of the present invention may include a ceramic main body 10 including a plurality of dielectric layers 1; and a plurality of internal electrodes 21 and 22 alternately laminated with the plurality of dielectric layers 1 within the ceramic main body 10 and formed of thin films including graphene.

The multilayer ceramic electronic component according to another embodiment of the present invention is the same as that of the above-described embodiment of the present invention, except that the plurality of dielectric layers and the plurality of internal electrodes are laminated. Therefore, a description thereof will be omitted.

Figure 4:
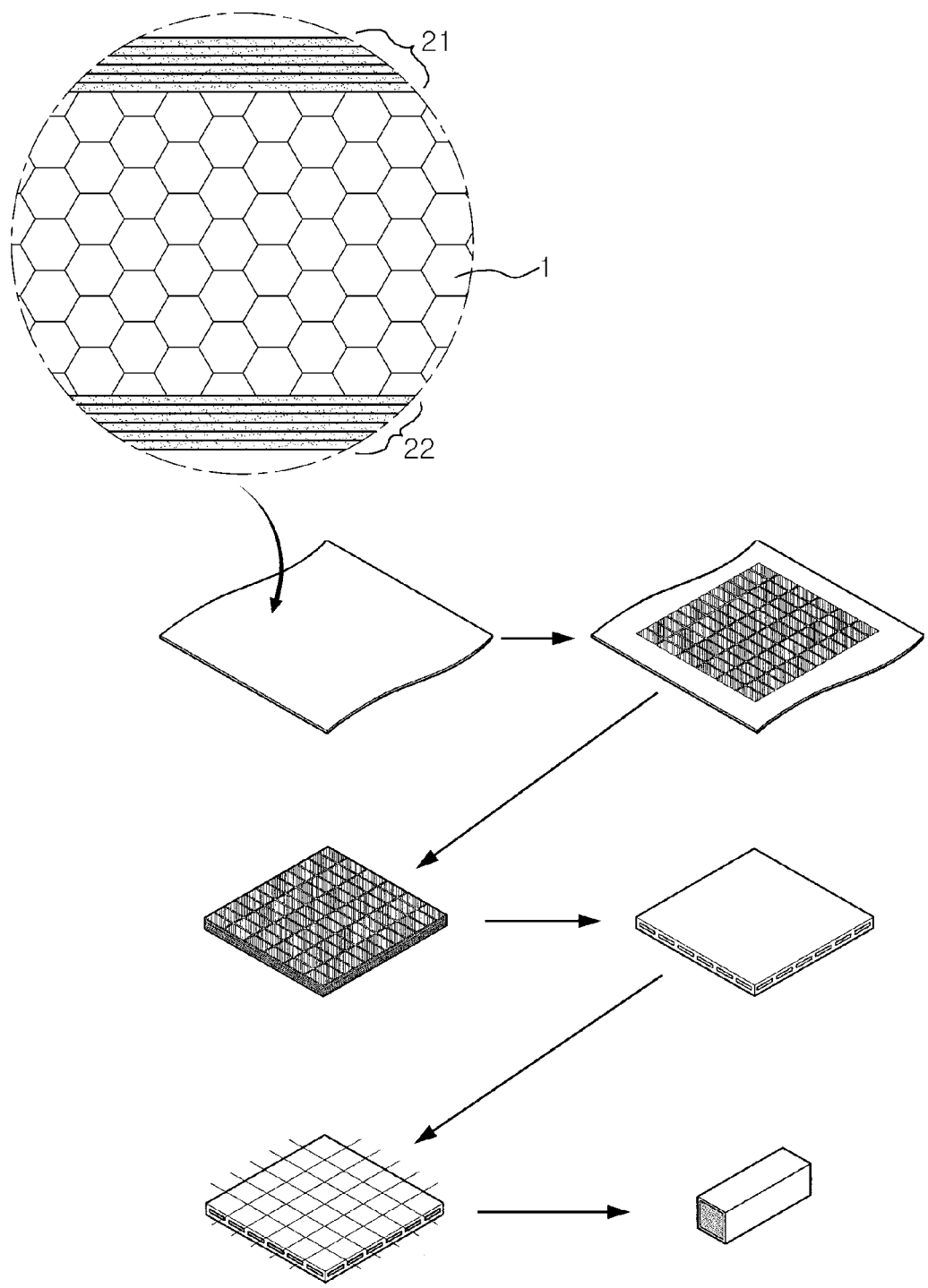
FIG. 4 is a process diagram showing a manufacturing process of a multilayer ceramic capacitor according to another embodiment of the present invention.

FIG. 4 is a process diagram showing a manufacturing process of a multilayer ceramic capacitor according to another embodiment of the present invention.

Referring to FIG. 4, a method of manufacturing a multilayer ceramic electronic component according to another embodiment of the present invention may include preparing a plurality of ceramic green sheets; forming first and second internal electrode patterns on the ceramic green sheets, the first and second internal electrode patterns being formed of a thin film including graphene; forming a ceramic laminate by laminating the ceramic green sheets having the first and second internal electrode patterns formed thereon; forming a ceramic main body by cutting the ceramic laminate so as to allow one ends of the first and second internal electrode patterns to be alternately exposed through ends of the ceramic main body and then firing the cut ceramic laminate; and forming first and second external electrodes on the ends of the ceramic main body so as to be electrically connected to one ends of the first and second internal electrodes.

Hereinafter, the method of manufacturing a multilayer ceramic electronic component according to another embodiment of the present invention will be described, but a description of characteristics that are overlapped with those of the above multilayer ceramic electronic component will be omitted.

First, a plurality of ceramic green sheets may be prepared.

A ceramic powder, a binder and a solvent may be mixed to prepare a slurry, and the slurry may be used to manufacture a sheet-type ceramic green sheet having thickness on the μm level by a doctor blade method.

In addition, first and second internal electrode patterns formed of a thin film including graphene may be formed on surfaces of the ceramic green sheets.

In addition, a method of forming the first and second internal electrodes 21 and 22 is not particularly limited, but may be for example, a chemical vapor deposition (CVD).

Since the first and second internal electrodes 21 and 22 are formed by CVD, they may be formed of thin films.

In addition, the first and second internal electrodes 21 and 22 may be formed on an upper portion of the dielectric layer 1 by a transfer method.

The thin film including the graphene may have a structure in which ten or less graphene thin films are laminated.

A thickness of the first internal electrode 21 or the second internal electrode 22 may be 5 nm or less.

Descriptions of the number of layers of the thin film including graphene and the thickness of the first or second internal electrode 21 or 22 are the same as those of the above-mentioned multilayer ceramic electronic component according to the embodiment of the present invention. Therefore, descriptions thereof will be omitted.

Then, the ceramic green sheets having the first and second internal electrode patterns formed of the thin films including graphene are laminated, and then pressurized in a lamination direction to thereby compress the multilayer ceramic green sheets and the internal electrode paste with each other.

Through the above-mentioned process, a ceramic laminate, in which the ceramic green sheets and the first and second internal electrodes 21 and 22 formed of the thin film including graphene are alternately laminated, is manufactured.

Then, the ceramic laminate is cut into pieces corresponding to individual capacitors to allow chips to be produced.

Thereafter, the chipped lamination is fired at about 1200° C. to produce a ceramic main body.

The ceramic main body may be subjected to surface grinding by treating it in a barrel including water and a grinding medium.

The surface grinding may be performed in the manufacturing of the ceramic laminate.

Then, the first and second external electrodes 31 and 32 may be formed to cover the ends of the ceramic main body and be electrically connected to the first and second internal electrodes 21 and 22 exposed through the ends of the ceramic main body.

Then, a plating treatment may be performed using nickel, tin, and the like on surfaces of the first and second external electrodes 31 and 32.

In the method of manufacturing a multilayer ceramic electronic component according to another embodiment of the present invention, the first and second internal electrode patterns 21 and 22 formed of the thin film including graphene may be formed to thereby decrease the thickness of the internal electrodes, such that capacitance may be increased.

Since the first and second internal electrodes 21 and 22 are formed of an ultra thin film as described above, the number of laminated layers in a multilayer ceramic electronic component having the same size as the related art component may be increased to thereby increase capacitance.

In addition, since graphene has excellent electrical conductivity and thermal conductivity, in the case in which the first and second internal electrodes 21 and 22 are formed of the thin film including graphene, thermal stability may be excellent.

In addition, since graphene allows the first and second internal electrodes 21 and 22 to be formed as a thin film, short-circuits between the thin internal electrodes may not occur to thereby improve withstand voltage characteristics.

As set forth above, according to embodiments of the present invention, a multilayer ceramic electronic component includes internal electrodes formed of a thin film including graphene, whereby capacitance may be increased and thermal stability and withstand voltage characteristics may be improved.

That is, the multilayer ceramic electronic component according to the embodiments of the present invention includes the internal electrodes formed of the thin film including graphene, whereby capacitance may be increased, and heat generated in the multilayer ceramic electronic component may be effectively radiated due to high thermal conductivity of graphene, whereby excellent thermal stability may be provided.

In addition, the internal electrodes are formed of the thin film including graphene, such that short-circuits between the internal electrodes may be prevented, whereby excellent withstand characteristics may be provided.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
a ceramic main body including a dielectric layer; and
first and second internal electrodes provided on upper and lower surfaces of the dielectric layer and formed of a thin film including graphene,
wherein the thin film including graphene has structure in which ten or less graphene thin films are laminated.

2. The multilayer ceramic capacitor of claim 1, wherein the first or second internal electrodes has a thickness of 5 nm or less.

3. The multilayer ceramic capacitor of claim 1, wherein the first and second internal electrodes are formed by a chemical vapor deposition (CVD) method.

4. The multilayer ceramic capacitor of claim 1, wherein the dielectric layer includes at least one selected from the group consisting of magnesium (Mg), calcium (Ca), strontium (Sr), barium (Ba), lanthanum (La), titanium (Ti), and zirconium (Zr).

5. A multilayer ceramic capacitor comprising:
a ceramic main body including a plurality of dielectric layers; and
a plurality of internal electrodes alternately laminated with the plurality of dielectric layers within the ceramic main body and formed of a thin film including graphene,
wherein the thin film including graphene has a structure in which ten or less graphene thin films are laminated.

6. The multilayer ceramic capacitor of claim 5, wherein each of the plurality of internal electrodes has a thickness of 5 nm or less.

7. The multilayer ceramic capacitor of claim 5, wherein the plurality of internal electrodes are formed by a chemical vapor deposition (CVD) method.

8. The multilayer ceramic capacitor of claim 5, wherein the dielectric layers include at least one selected from the group consisting of magnesium (Mg), calcium (Ca), strontium (Sr), barium (Ba), lanthanum (La), titanium (Ti) and zirconium (Zr).

9. A method of manufacturing a multilayer ceramic electronic component, the method comprising: preparing a plurality of ceramic green sheets; forming first and second internal electrode patterns on the ceramic green sheets, the first and second internal electrode patterns being formed of a thin film including graphene; forming a ceramic laminate by laminating the ceramic green sheets having the first and second internal electrode patterns formed thereon; forming a ceramic main body including first and second internal electrodes by cutting the ceramic laminate so as to allow one ends of the first and second internal electrode patterns to be alternately exposed through ends of the ceramic main body and then firing the cut ceramic laminate; and forming first and second external electrodes on the ends of the ceramic main body so as to be electrically connected to one ends of the first and second internal electrodes; wherein the thin film including graphene has a structure in which ten or less graphene thin films are laminated.

10. The method of claim 9, wherein the first or second internal electrodes has a thickness of 5 nm or less.

11. The method of claim 9, wherein the forming of the first and second internal electrode patterns is performed by a chemical vapor deposition (CVD) method.

\* \* \* \* \*